United States Patent Office 3,149,162
Patented Sept. 15, 1964

3,149,162
PURIFICATION OF HYDROGENATION PRODUCTS
Cyril Gardner and John Fraser Prescott, Manchester, England, assignors to Imperial Chemical Industries Limited, London, England, a corporation of Great Britain
No Drawing. Filed Mar. 17, 1961, Ser. No. 96,388
Claims priority, application Great Britain, Mar. 23, 1960, 10,261/60
6 Claims. (Cl. 260—582)

This invention relates to purification of hydrogenation products, in particular to the purification of aromatic diamines.

It is already known to manufacture primary aromatic diamines by the reduction of dinitro compounds produced by the direct nitration of aromatic hydrocarbon. These aromatic diamines may be reacted with phosgene to produce aromatic diisocyanates, which are useful in the manufacture of cellular and homogeneous polyurethanes. However, it has been found that phosgenation of aromatic diamines frequently gives rise to the formation of substantial amounts of resinous by-products, reducing the yield of the required diisocyanates. Moreover the resultant diisocyanates are rendered somewhat unsatisfactory for use in polyurethane formation. Purification of the diamines by distillation does not give satisfactory results, and is an unattractive procedure in the present instance.

It has now been found that the difficulties associated with the use of the prior art processes may be obviated or minimised by treating aromatic diamines with a solvent at a low temperature, and removing the suspended purified diamines from the solution of impurities.

Thus according to the present invention there is provided a process for the purification of aromatic diamines which comprises treating said aromatic diamines with a solvent at a temperature of from +20° C. to —20° C. and removing the undissolved purified aromatic diamines from the solution.

The process of the present invention is especially useful for the removal of impurities such as the ortho-diamines from the mixed tolylene diamines obtained by reduction of the dinitro compounds that are obtained by direct nitration of toluene. The purified mixed tolylene-2:4- and -2:6-diamines obtained by the process of the present invention may be converted to tolylene diisocyanates of good colour, which are eminently satisfactory for use in polyurethane manufacture.

It is preferred to use a temperature of from 0° to —20° C.

Suitable solvents for use in the present process include for example water, alcohols such as methanol, ethanol and isopropanol, and mixtures of such alcohols with water, and mixtures of chloroform, carbon tetrachloride and aromatic hydrocarbons such as benzene, toluene and xylene, with aliphatic hydrocarbons such as hexane, heptane, isooctane, cyclohexane and mixtures thereof, for example light petroleum (boiling point 40° to 60° C.), and o-dichlorobenzene.

Particularly valuable solvents for use in the present process are isopropanol and water and mixtures of isopropanol and water, and o-dichlorobenzene.

The solvent is normally used in an amount of from half to ten times the weight of the aromatic diamines to be purified. However smaller or greater amounts of solvent may sometimes be used, depending on the nature of the solvent and of the diamine mixture, and on the temperature range employed.

The process of the present invention may be carried out by mixing the aromatic diamines, preferably in a finely divided form, with the solvent at the desired temperature, and agitating the mixture until all soluble material has dissolved. Alternatively the diamines and solvent may be mixed at an elevated temperature, for example at 50° to 100° C. until all soluble material has dissolved, and then cooling the mixture to the desired temperature range. When equilibrium between the undissolved material and the solution is attained at the lower temperature range the undissolved purified dimines are removed by for example filtration or centrifugal means.

When the mixture of diamines and solvent on cooling from a higher temperature for example 50° to 100° C. to the desired temperature range of —20° C. to +20° C. is too thick for separation by filtration or centrifugal means it is preferred that the mixture be cooled to an intermediate temperature for example 30° to 40° C. the diamines remaining undissolved at this temperature removed by filtration or centrifugal means and the mother liquors cooled to the desired temperature range of —20° to +20° C. and when equilibrium between the undissolved material and the solution is attained the remainder of the purified diamines removed by filtration or centrifugal means.

It is preferred to wash the separated diamine with more of the pure solvent used in the purification stage. The filtrate from the washing operation may be used as the solvent in a subsequent purification procedure.

The process of the present invention provides a simple and efficient method of obtaining aromatic diamines, especially tolylene diamines, in an exceptionally pure form, suitable for conversion to diisocyanates of high quality.

The invention is illustrated but not limited by the following examples in which parts and percentages are by weight:

Example 1

250 parts of a molten mixture of diaminotoluenes prepared by catalytic reduction of the dinitrotoluenes obtained by direct nitration of toluene and consisting mainly of the 2:4- and 2:6-isomers but containing 7.1 parts of ortho isomers was added with stirring over 1 hour to 430 parts of isopropanol maintained at —20° C. The undissolved crystalline product was separated by filtration, washed with a small amount of isopropanol and dried in vacuo. The dried product amounting to 240.2 parts contained only 3.1 parts of ortho isomers, representing a recovery of 97% of the meta isomers present and a decrease in the ortho isomer content from 2.9 to 1.3%.

Example 2

345.2 parts of a mixture of diaminotoluenes prepared by catalytic reduction of the dinitrotoluenes obtained by direct nitration of toluene and consisting mainly of the 2:4- and 2:6-isomers but containing 9.3 parts of ortho isomers was dissolved in 138.2 parts of isopropanol at 70° C. The resulting solution was cooled with stirring to 35° C. and held at 35° C. for 1 hour. The crystalline product was separated by filtration and dried in vacuo. The filtrate was cooled with stirring to 0° C. and held at 0° C. for 1 hour. The second crop of crystalline product was separated by filtration and dried in vacuo. The combined dried products amounting to 326.4 parts contained only 2.3 parts of ortho isomers representing a recovery of 95.6% of the meta isomers and a decrease in the ortho isomer content from 2.7 to 0.7%.

Example 3

350 parts of a mixture of diaminotoluenes prepared by catalytic reduction of the dinitrotoluenes obtained by direct nitration of toluene and consisting mainly of 2:4- and 2:6-isomers but containing 9.1 parts of ortho isomers was dissolved in 350 parts orthodichlorobenzene at 80° C. The resulting solution was cooled to 0° C. and held at 0° for 1 hour. The crystalline product separated by filtration and washed with a small amount of orthodichlorobenzene. The wet crystals obtained contained 337.4 parts of diamine including 2.3 parts of ortho isomers, representing a recovery of 98% of the meta isomers present and a decrease in the ortho isomer content from 2.6 to 0.6%.

What we claim is:

1. A process for the purification of toluene diamines prepared by the reduction of the corresponding dinitrotoluenes which comprises: mixing said diamines with from half to ten times the weight of said diamines of a solvent selected from the group consisting of o-dichlorobenzene, a lower alkyl alcohol, a mixture of said alcohol and water, and a mixture of at least one aliphatic hydrocarbon having from 6 to 8 carbon atoms with at least one member of the group consisting of chloroform, carbon tetrachloride benzene, toluene and xylene; to dissolve the impurities; and removing the undissolved purified diamines from the solution at a temperature of from +20° C. to −20° C.

2. A process as claimed in claim 1 wherein the diamines are mixed tolylene diamines.

3. A process as claimed in claim 1 wherein the removal of undissolved purified diamines from the solution is carried out at a temperature from 0° C. to −20° C.

4. A process as claimed in claim 1 wherein the diamines and solvent are first mixed at an elevated temperature of 50°–100° C. until all the soluble material has dissolved and then cooled at +20° to −20° C. and the undissolved purified diamines removed.

5. A process as claimed in claim 4 wherein diamines remaining undissolved at a temperature of 30° to 40° C. are removed and the remaining solution cooled to +20° C. to −20° C. and further undissolved purified diamines removed.

6. A process as claimed in claim 4 wherein the undissolved separated diaminies are washed with more of the solvent used in the purification stage.

References Cited in the file of this patent
UNITED STATES PATENTS

| | | |
|---|---|---|
| 1,918,997 | Weiland | July 18, 1933 |
| 2,839,578 | Brimer | June 17, 1958 |